(12) United States Patent
Tanaka

(10) Patent No.: US 10,674,231 B2
(45) Date of Patent: Jun. 2, 2020

(54) RECEIVING APPARATUS CAPABLE OF RECEIVING DIGITAL CONTENTS AND COMMERCIAL MESSAGES

(71) Applicant: Masahide Tanaka, Osaka (JP)

(72) Inventor: Masahide Tanaka, Osaka (JP)

(73) Assignee: NL GIKEN INCORPORATED, Osaka (JP)

( * ) Notice: Subject to any disclaimer, the term of this patent is extended or adjusted under 35 U.S.C. 154(b) by 11 days.

(21) Appl. No.: 15/693,668

(22) Filed: Sep. 1, 2017

(65) Prior Publication Data

US 2017/0366873 A1 Dec. 21, 2017

Related U.S. Application Data

(63) Continuation of application No. 14/536,634, filed on Nov. 9, 2014, which is a continuation of application
(Continued)

(30) Foreign Application Priority Data

Feb. 18, 2009 (JP) .................................. 2009-035974

(51) Int. Cl.
*H04N 21/81* (2011.01)
*G11B 27/32* (2006.01)
(Continued)

(52) U.S. Cl.
CPC ......... *H04N 21/812* (2013.01); *G11B 27/105* (2013.01); *G11B 27/329* (2013.01);
(Continued)

(58) Field of Classification Search
CPC ............ H04N 21/812; H04N 21/4667; H04N 21/4662; H04N 21/44008; H04N 21/4784;
(Continued)

(56) References Cited

U.S. PATENT DOCUMENTS 6,698,020 B1 * 2/2004 Zigmond ........... H04N 5/44513
348/E5.102
7,043,746 B2 * 5/2006 Ma ..................... G06Q 30/0207
348/E7.071

(Continued)

*Primary Examiner* — Yassin Alata

(57) ABSTRACT

A receiving apparatus comprises a recorder of the received digital contents and commercial messages. Commercial message retrieved from the recorder is interposed into a digital content or between a pair of digital contents in accordance with the type of commercial message. Interposition of commercial message is controlled by internal information, such as history of actually displaying the same commercial message, or history of skipping the same commercial message. The receiving apparatus controls the repetition time of displaying the same commercial message, or decision whether or not actually displaying a specific commercial message, or the order of displaying commercial messages. Skip of commercial message is prevented unless display has been repeated over a minimum requirement, or user agrees with a compensation for the skip. Repetition of the same commercial message ceases with skip repeated over a limit. Notice of interposing commercial message or of compensation for skip is made in advance.

16 Claims, 7 Drawing Sheets

Related U.S. Application Data

No. 12/705,572, filed on Feb. 13, 2010, now Pat. No. 8,930,986, which is a continuation-in-part of application No. 12/134,298, filed on Jun. 6, 2008, which is a continuation-in-part of application No. 11/774,605, filed on Jul. 8, 2007, now Pat. No. 8,677,391.

(51) Int. Cl.

| | |
|---|---|
| *H04N 5/76* | (2006.01) |
| *H04N 21/2543* | (2011.01) |
| *H04N 21/433* | (2011.01) |
| *H04N 21/4335* | (2011.01) |
| *H04N 21/472* | (2011.01) |
| *H04N 21/4784* | (2011.01) |
| *G11B 27/10* | (2006.01) |
| *H04N 21/44* | (2011.01) |
| *H04N 21/462* | (2011.01) |
| *H04N 21/466* | (2011.01) |
| *H04N 5/765* | (2006.01) |
| *H04N 5/783* | (2006.01) |

(52) U.S. Cl.
CPC ......... *H04N 5/76* (2013.01); *H04N 21/25435* (2013.01); *H04N 21/4334* (2013.01); *H04N 21/4335* (2013.01); *H04N 21/44008* (2013.01); *H04N 21/4622* (2013.01); *H04N 21/4667* (2013.01); *H04N 21/4784* (2013.01); *H04N 21/47214* (2013.01); *H04N 5/765* (2013.01); *H04N 5/783* (2013.01)

(58) Field of Classification Search
CPC ......... H04N 21/47214; H04N 21/4334; H04N 21/25435; H04N 21/4335
See application file for complete search history.

(56) References Cited

U.S. PATENT DOCUMENTS

| | | | |
|---|---|---|---|
| 7,613,691 B2* | 11/2009 | Finch | G06Q 30/02 |
| 2005/0289588 A1* | 12/2005 | Kinnear | H04N 5/76 |
| | | | 725/35 |
| 2010/0058382 A1* | 3/2010 | Yu | H04N 7/17318 |
| | | | 725/35 |
| 2010/0153994 A1* | 6/2010 | Alexander | H04N 7/163 |
| | | | 725/35 |

* cited by examiner

RECEIVING APPARATUS CAPABLE OF RECEIVING DIGITAL CONTENTS AND COMMERCIAL MESSAGES

CROSS RELATION TO RELATED APPLICATION

This application is a continuation of U.S. application Ser. No. 14/536,634, filed Sep. 9, 2014, which is a continuation of U.S. application Ser. No. 12/705,572, filed Feb. 13, 2010, which is a continuation-in-part of U.S. application Ser. No. 12/134,298, filed Jun. 6, 2008, which is a continuation-in-part of U.S. application Ser. No. 11/774,605, filed Jul. 8, 2007, herein incorporated by reference in its entirety.

BACKGROUND OF THE INVENTION

1. Field of the Invention

This invention relates to a receiving apparatus capable of receiving digital contents and commercial messages, such as a television system.

2. Description of the Related Art

In the conventional commercial television system, a television program is provided by a broadcast station with commercial message by the sponsor of the program inserted therein. Recently, the television program is delivered as a compressed digital data capable of being downloaded through Internet in addition to the conventional way of delivery through the broadcast airwave.

According to the increase of variety of providing the moving image contents, various ideas are proposed in relation to the moving image contents and commercial message. For example, Japanese Laid-open Patent Application 2001-285743 proposes to display in a window of website a part of television commercial message for selection by audiences. On the other hand, Japanese Laid-open Patent Application 2001-285830 proposes a digital television system in which a coupon is issued in exchange of viewing a commercial message.

However, there still remains a demand in this field of art to improve the relationship between moving image contents and commercial messages

SUMMARY OF THE INVENTION

An object of this invention is to provide a receiving apparatus capable of receiving digital contents and commercial messages in which the relationship between the digital contents and the commercial messages is improved.

Another object of this invention is to provide a practical receiving apparatus capable of receiving digital contents and commercial messages.

To achieve one of the above objects, this invention provides a receiving apparatus capable of receiving digital contents and commercial messages from outside source comprising a recorder arranged to record commercial messages received from outside source, a display arranged to display digital content received from outside source and commercial message retrieved from the recorder, and a controller arranged to control the display of the commercial message at the display in relation to the display of the digital content.

According to a detailed feature of this invention, the commercial message is received with information for displaying it, wherein the controller is arranged to control the display of the commercial message at the display in accordance with the information included in the commercial message. In other words, the information is received from outside source along with the commercial message.

A typical example of the information relates to the type of commercial message. In more detail, the controller is arranged to interpose the commercial message into a digital content in accordance with the information relating to one type of the commercial message. Or, the controller is arranged to interpose the commercial message between a pair of digital contents in accordance with the information relating to another type of the commercial message.

According to another detailed feature of this invention, the recorder is arranged to record the digital content received from outside source. In this case, the display displays digital content and digital content both retrieved from the recorder.

According to another detailed feature of this invention, the controller is arranged to control the display of the commercial message at the display in accordance with internal information originated within the receiving apparatus. In more detail, the internal information includes history of actually displaying the commercial message. Or, the internal information includes history of the commercial message skipped at the receiving apparatus.

According this invention, the controller controls the display of the commercial message at the display in relation to the display of the digital content in various advantageous manners. For example, the controller controls the repetition time of displaying the same commercial message. Or, the controller controls whether or not to actually display a specific commercial message. Or, the controller controls the order of displaying a plurality of commercial messages.

To achieve the objects above, this invention also provides a receiving apparatus capable of receiving digital contents and commercial messages from outside source comprising a display arranged to display the digital content and the commercial message, an operating portion arranged to transmit a will of a user to skip the display of the commercial message, and a controller arranged to control the display of the commercial message at the display in combination with the operating portion.

According to a detailed feature of this invention above, the controller prevents receiving apparatus from carrying out to skip the display of the commercial message in response to the operating portion under a predetermined condition. A typical example of the predetermined condition is that the repetition time of displaying the same commercial message is less than a minimum requirement. Another example of the predetermined condition is that the user disagrees with a necessary compensation for the skip of the commercial message.

According to another detailed feature of this invention relating to the operating portion above, the controller is arranged to display the same commercial message no more with the will of the user repeatedly transmitted through the operating portion over a predetermined times.

To achieve the objects above, this invention also provides a receiving apparatus capable of receiving digital contents and commercial messages from outside source comprising a display arranged to display the digital content and the commercial message, and a controller arranged to control the display of the commercial message alternatively in a first mode to display the digital content with the commercial message interposed and in a second mode to display the digital content with the commercial message not interposed.

According to a detailed feature of this invention above, the controller is arranged to make notice that the controller displays the digital content in the first mode. According to another detailed feature of this invention above, the controller is arranged to make notice that compensation is need for an elimination of the commercial message.

Other features and advantages according to this invention will be readily understood from the detailed description of the preferred embodiment in conjunction with the accompanying drawings.

The detailed description of the preferred embodiment according to this invention includes various detailed features derived from the above mentioned features. However, such detailed features are not only applicable to the above mentioned features, but also are widely and independently applicable to other objects and features. So, the above description should not be deemed to limit the scope of this invention, which should be properly determined on the basis of the attached claims.

DETAILED DESCRIPTION OF THE PREFERRED EMBODIMENT

Figure 1:
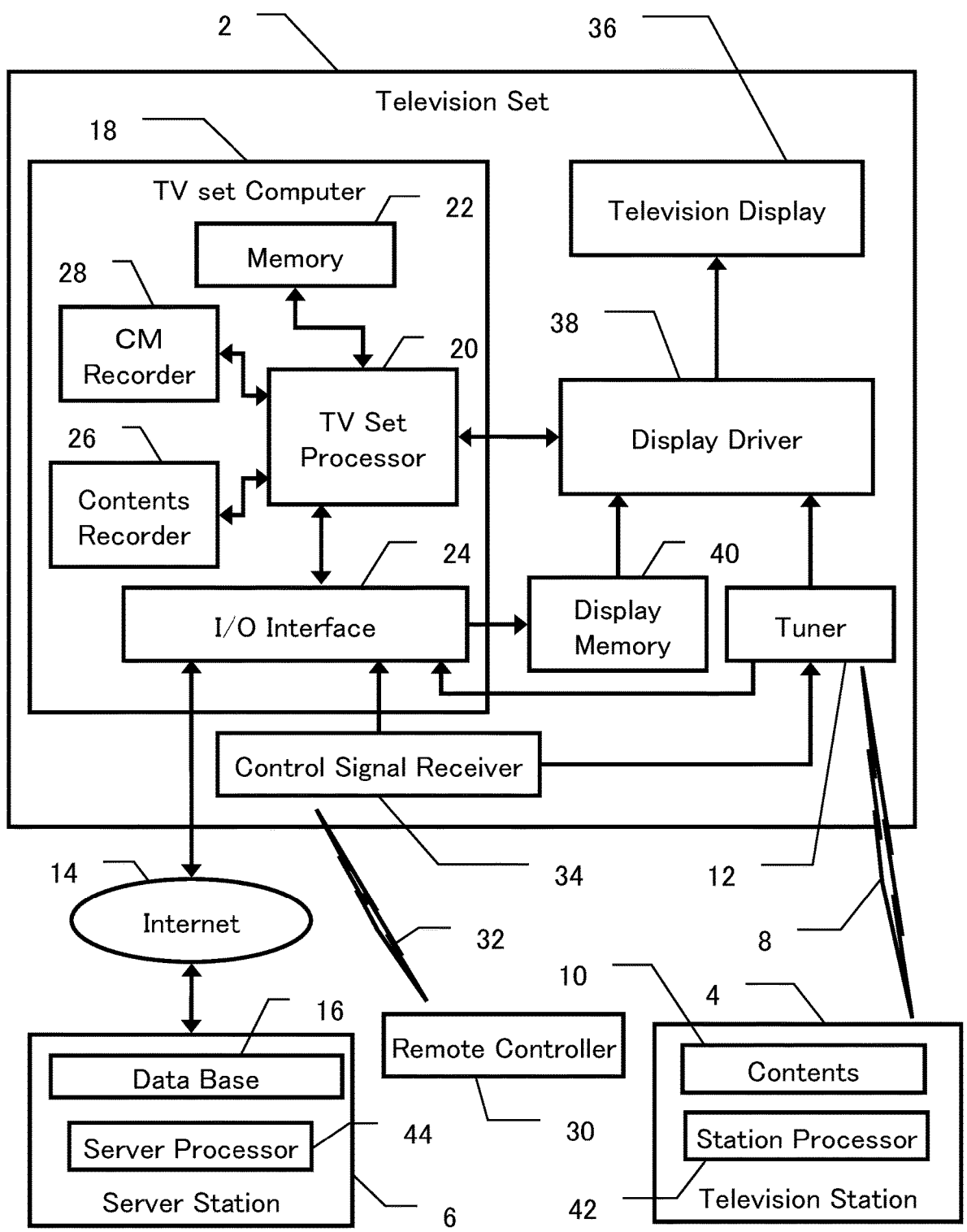
FIG. 1 is a block diagram showing a digital moving image contents viewing system including the digital contents providers and the digital contents receiving apparatus in whole according to an embodiment of this invention.

FIG. 1 is a block diagram showing a digital moving image contents viewing system including the digital contents providers and the digital contents receiving apparatus in whole according to an embodiment of this invention. The embodiment includes television set 2 as the digital contents receiving apparatus, and television station 4 and server station 6 as providers of the digital contents. Television set 2 in the system includes tuner 12 for receiving a conventional digital broadcast television program content 10 transmitted on digital airwave 8 from television station 4. Tuner is also capable of receiving commercial message (CM) incorporated into television program content 10.

Television set 2 also includes television set computer 18 for receiving a digital moving image program content data and commercial massage (CM) data provided by server station 6 through internet 14. Television set computer 18 includes television set processor 20, memory 22 and input/output interface 24. Input/output interface 24 serves as a communication part for receiving data of digital moving image program contents and commercial message stored in data base 16 of server station 6 delivered by way of internet 8. Memory 22 is for storing computer programs executed by television set processor 20 and also for storing various temporary data necessary for television set processor 20 to execute its function.

Contents recorder 26 is for recording digital moving image contents downloaded from server station 6 through internet 14 by way of input/output interface 24. Contents recorder 26 is of such a large capacity including a hard disk as capable of storing a considerable number of digital moving image program contents data. CM recorder 28 is for recording CM data downloaded from server station 6 through internet 14 by way of input/output interface 24. CM recorder 28 also is of such a large capacity including a hard disk as capable of storing a considerable number of CM data. CM data stored in CM recorder 28 include such data as to have turned out to be never viewed at last on television set 2. CM data are classified according to various agreements with the advertisers into so-called "time CM" data tied to specific digital moving image content and controlled by a sponsor of such a digital moving image content and so-called "spot CM" which is not tied to any specific digital moving image content. "Spot CM" data are further classified into so-called "participation CM (PTCM)" data to be inserted into divisions of a digital moving image content and so-called "station break CM (SBCM)" to be inserted between one digital moving image content and next digital moving image content.

Input/output interface 24 is further capable of inputting a control signal transmitted on infra red ray 32 from remote controller 30 and received by control signal receiver 34, which is reported to television set processor 20 for necessary function according to the control signal. Remote controller 30 is to be manually operated for the purpose of turning on/off the main power of television set 2, selecting channels of television stations, and adjusting the audio volume of television set 2. Remote controller 30 further serves as a graphical user interface (GUI) in conjugation with television display 36, in such a manner that remote controller 30 operates various visual buttons displayed on television display 26 or selects among operations in a menu displayed on television display 36. The signal from remote controller 30 received by control signal receiver 34 is also capable of being directly transmitted to tuner 12 on necessity. Tuner 12, which receives a digital broadcast television program content transmitted on digital airwave 8 from television station 4 as has been mentioned above, will replace television station 4 with another television station in response to a channel selection signal of remote controller 30 directly transmitted by way of control signal receiver 34.

Display driver 38 responsive to data signal from tuner 12 drives television display 36 to display a digital broadcast television program content on television display 36. Display driver 38 further responsive to data signal from display memory 40 drives television display 36 to display a computer display signal transmitted by way of input/output interface 24 under control by television set processor 20. The computer display signal is displayed on television display 36 in such a manner that the display signal is superimposed on a part of digital broadcast television program content as a GUI display in cooperation with remote controller 30. The computer display signal may be alternatively displayed on television display 36 in such a manner that the display signal replaces the entire digital broadcast television program content as an operation menu or a broadcast program schedule table, which is to be selected by an operation at remote controller 30. A digital broadcast television program content received by tuner 12 can also be transmitted to input/output interface 24, and in turn stored in contents recorder 26 in response to remote controller 30 as in the similar manner to the case of the ordinary video tape recorder.

On the other hand, a digital moving image program content data and CM data provided by server station 6 through internet 14 and stored in contents recorder 26 and CM recorder 28, respectively, are converted into moving image data under the control of television set processor 20 to be transmitted to display memory 40 by way of input/output interface 24, and in turn to display driver 38. If display driver 38 under the control of television set processor 20 selects digital moving image program data and/or CM data from display memory 40 in place of those from tuner 12, a digital moving image program content data provided by server station 6 though internet 14 is displayed on television display 36 in place of the digital broadcast television program content from television station 4. In this case, an on-demand or live digital moving image program content can be directly provided by server station 6 and displayed on television display 36 in almost real time by means of the streaming technology through internet 14. Another example of the real time digital moving image program contents provided by server station 6 though internet 14 on the streaming technology is a digital moving image program provided in accordance with a program schedule table voluntarily determined by server station 6 in a similar manner to the case of television station 4.

As in the above, television set 2 according to the embodiment of this invention in FIG. 1 can enjoy both the digital broadcast television program contents from television station 4 on digital airwave 8 and digital moving image program contents provided by server station 6 though internet 14. Further, television set 2 according to the embodiment of this invention in FIG. 1 can not only select between a digital moving image content on air and a digital moving image content downloaded though internet 14, but also can combine both in advantageous manners, which will be explained in accordance with the following flow charts.

As has been mentioned, the digital moving image contents enjoyable on television display 36 are not only the digital moving image program contents on air by television station 4 or the digital moving image contents downloaded from server station 6 though internet 14 and stored in contents recorder 26, but also a real time digital moving image contents provided by server station 6 on the streaming technology. In the case of a real time digital moving image content downloaded from server station 6 through streaming technology, Uniform Resource Locator (URL) for accessing such real time digital moving image content is considered as a channel of a broadcast station, provided that server station 6 is prepared to regularly provide the real time digital moving image program contents in accordance with a program schedule table similar to that by television station 4.

Television station 4 includes station processor 42 for controlling the above functions of providing the digital broadcast television program contents on digital airwave 8. On the other hand, server station 6 includes server processor 44 for controlling the above functions of providing the digital moving image program contents data and CM data though internet 14.

Figure 2:
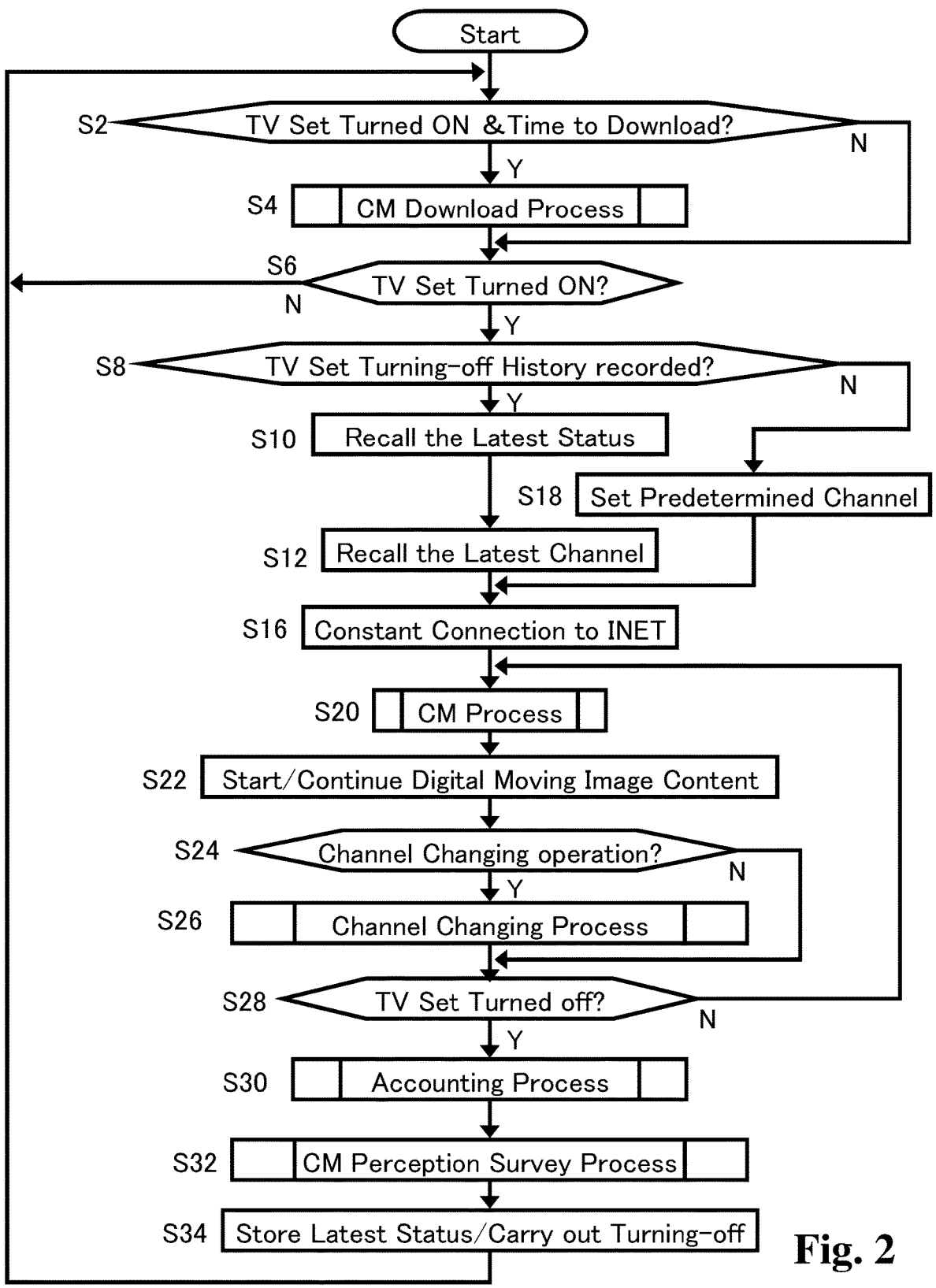
FIG. 2 is a basic flowchart showing the function carried out by television set processor of television set computer in FIG. 1.

FIG. 2 is a basic flowchart showing the function carried out by television set processor 20 of television set computer 18 in FIG. 1. The flowchart starts when television set 2 is connected to the power receptacle, and it is checked in step S2 whether or not television set 2 is in turned-off condition and the scheduled time has come to download CM. If it is detected in step 2 that the time to download has come with television set 2 turned off, the flow goes to step S4 to carry out CM download process, in which CM data is automatically downloaded from server station 6 for recording into CM recorder 28 during television set 2 is turned off. CM data, including one or more of "time CM" data, "participation CM (PTCM)" data and "station break CM (SBCM)", to be downloaded are automatically determined in cooperation with server processor 44 depending on the time to download and CM data which have been already downloaded and recorded in CM recorder 28.

The flow advances to step S6 when the download of CM to be carried out at the scheduled time has been completed in step S4. On the other hand, if it is determined in step S2 that television set 2 is in turned-on state or the scheduled time has not come, the flow directly goes to step S6. In step S6, it is checked whether or not television set 2 is turned on. If it is determined in step S6 that television set 2 is turned on, the flow advances to step S8. On the other hand, if it not determined in step S6 that television set 2 is turned on, the flow returns to step S2 to repeat steps S2 —on operation at step S6. During the repetition, CM download operation will be carried out if it is detected in step S2 that the next scheduled time has come. Thus, a plurality of CM download operations are to be carried out if television set 2 is kept in the turned-off state for a long time.

The "turn on operation" to be checked in step S6 broadly means an operation by a user willing to turn television set 2 into active state. For allowing such operation, a power switch is normally turned on in advance for making television set 2 in a standby state capable of detecting turn on operation at remote controller 30. Accordingly, "turn on operation" should not be strictly construed to the turning on of the power switch for truly turning on the television set 2, but is construed to also include the turn on operation at remote controller 30 or the like with the power switch having been turned on in advance for the standby state.

In step S8, it is check whether or not such a history is recorded in memory 22 that television set 2 was turned off after television set 2 had been connected to the power receptacle. If such the record is detected in step S8, the flow goes to step S10 to recall the status of television set 2 right before the latest turning-off. And the flow goes to step S12 to recall the channel selected when television set 2 was turned off at the previous time. This is because that the latest channel is presumed to be of the most interested one. As has been mentioned, in the case of a real time digital moving image content downloaded at input/output interface from server station 6 through internet 14 on streaming technology, Uniform Resource Locator (URL) for accessing such real time digital moving image content is considered as the latest channel. For the purpose of enabling the above case of streaming, television set computer 18 comes into constant connection status to internet 14 in step S16. On the other hand, if it is not detected in step S8 that the above mentioned television set turning-off history is recorded in memory 22, the flow goes to step S18 to set a predetermined channel as a default to go to step S16.

After the constant connection is established in step S16, the flow goes to step S20 for CM process, in which CM is selected and inserted into contents, the details of which will be later described. The flow then goes to step S22 for instructing display driver 38 to start displaying the digital moving image content. If the display of the digital moving image content has been started, continuation of display is instructed in step S22. After the start or continuation of displaying the digital moving image content in step S22, the flow goes to step S24 with the display continued. In step S24, it is checked whether or not an operation is done to change the channel selection. If such an operation is detected, the flow goes to step S26, in which channel selection changing process is carried out, followed by step S28. On the other hand, if it is not detected in step S24 that any operation is done to change the channel selection, the flow directly goes to step S28.

In step S28, it is checked whether or not an operation is done to turning-off television set 2. And, if the television set turning-off operation is detected in step S28, the flow goes to step S30. On the other hand, if the television set turning-off operation is not detected in step S28, the flow goes back to step S20 to repeat the loop of steps S20 to step S28 unless the television set turning-off operation is detected in step S28. And, during the repetition of the loop, the display on television display 36 is continued with CM timely inserted in accordance with the progress of digital moving image contents due to step S20.

In step S30, accounting process in compensation for the view of digital moving image contents is carried out, the details of which will be described later. Next, in step S32, CM perception survey process is carried out to survey what CM is actually inserted and viewed, the result of the survey serving as important information for the advertiser of each CM. The details of the CM perception survey process will be also described later. Further, in step S34, the status of television set 2 right before the turning-off operation is stored in memory 22 and the turning-off of television set 2 is carried out. Due to the function in step S34 to store the status of television set 2, various checks and functions to be carried out in steps S8 to S12 are made possible. The flow then goes back to step S2 to repeat the various functions in FIG. 2 depending on turning on and off operations for carrying out the download of new CM data and the view of digital moving image contents with CM inserted.

Figure 3:
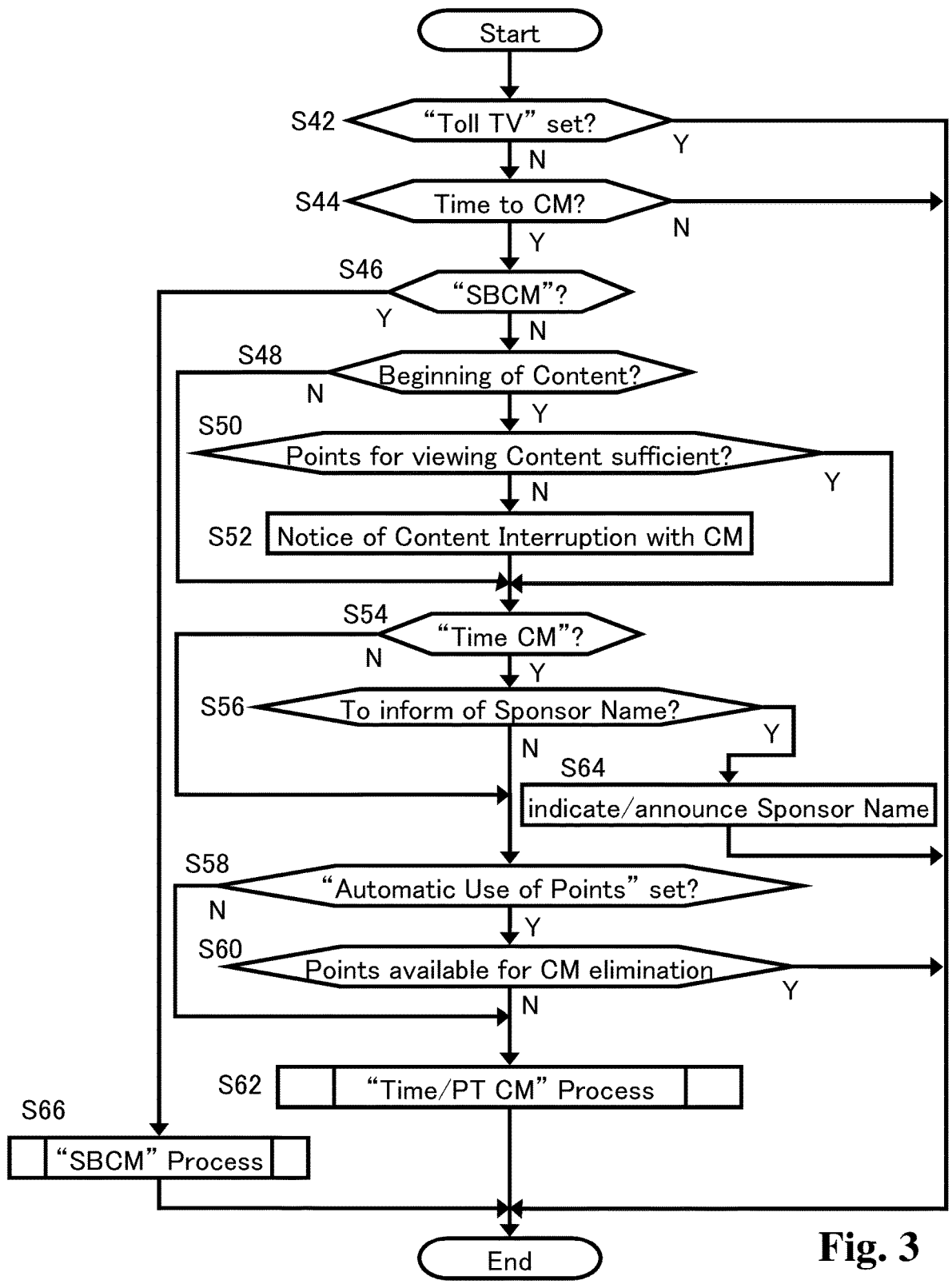
FIG. 3 is a flowchart showing the detailed function of the CM process in step S20 in FIG. 2.

FIG. 3 is a flowchart showing the detailed function of the CM process in step S20 in FIG. 2. If the flowchart starts, it is checked in step S42 whether or not "toll television" mode is set. In the "toll television" mode, pure digital moving image contents are to be viewed without interruption by any CM by means of a contract with a provider of the moving image provider to which the necessary toll is paid. If "toll television" mode is not set, on the contrary, toll-free viewing of digital moving image content is possible on the condition that CM is to be viewed in accordance with a predetermined rule. The rule for the toll-free viewing includes not only a conventional toll-free television program in which the digital moving image content is to be interrupted by CM, but also such a case that digital moving image content is to be viewed with CM eliminated by means of using points which have been earned through previously viewing the CM.

If it is determined in step S42 that "toll television" mode is set, the flow instantly goes to the end to terminate CM process, which is followed by step S22 in FIG. 2 for starting digital moving image content. On the other hand, if it is not determined in step S42 that "toll television" mode is set, the flow goes to step S44 to check whether or not time to interpose CM comes. If time to CM is not determined in step S44, the flow instantly goes to the end of CM process to start digital moving image content in S22 in FIG. 2. In this case, if digital moving image content has begun, the digital moving image content is simply continued in step S22.

On the contrary, if time to CM is determined in step S44, the flow advances to step S46 to check whether or not the CM to be interposed at that time is "station break CM (SBCM)" for insertion between a pair of unspecified digital moving image contents. If it is not determined in step S46 that the CM to be interposed is "station break CM (SBCM)", it means that the time to CM is for "time CM" or for "participation CM (PTCM)" that is related to a specific digital moving image content. So, the flow goes to step S48 in this case to check whether or not the time to CM is determined at the beginning of the digital moving image content.

If it is determined in step S48 that the time to CM is determined at the beginning of the digital moving image content, the flow goes to step S50 to check whether or not the number of points which have been earned through previously viewing CM's valid for the digital moving image content is sufficient for the user to view the entire of the specific digital moving image content with all related CM's eliminated under the condition of toll-free. If the sufficient number of points is failed to be confirmed in step S50, the flow goes to step S52 to notice that the digital moving image content cannot but be interrupted by CM in the course of viewing the digital moving image content, the flow then going to step 54. On the other hand, if the sufficient number of points is successfully confirmed in step S50, the flow directly goes to step S54 without any notice since digital moving image content is to be viewed with CM eliminated by means of using the points valid for the digital moving image content. Further, if it is not determined in step S48 that the time to CM is determined at the beginning of the digital moving image content, the flow directly goes to step S54 since it is too late to make the notice with the digital moving image content already having been started.

In step S54 it is checked whether or not the CM to be interposed at the time detected in step S44 is "time CM". If "time CM" is determined in step S54, the flow goes to step S56 to check whether or not the "time CM" is for informing the user of the name of sponsor who provide the digital moving image content. If not, the flow goes to step S58. Further, if it is not determined that the CM to be interposed at the time detected in step S44 is "time CM", the flow directly goes to step S58 without any notice of sponsor name since the CM corresponds to "participation CM (PTCM)", the advertiser of which is not a sponsor of the digital moving image content.

In step S58 it is checked whether or not such a setting is done by the user that available or valid points if any will be automatically used to view the digital moving image content with the CM eliminated. If the above setting is determined in step S58, the flow goes to step S60 to check whether or not the number of available points is sufficient for eliminating the CM otherwise to be interposed at the time detected in step S44. It should be noted that the check in step S60 is not for the number of points sufficient to view the entire digital moving image content with all related CM's eliminated as in step S50, but is for the number of available points sufficient for eliminating one CM otherwise to be interposed at the time detected in step S44.

If the sufficient number of points is failed to be detected in step S60, the flow goes to step S62 for "time CM" and "participation CM (PTCM)" process since it is impossible for the user to continue viewing the digital moving image content with CM eliminated under toll-free condition. After the completion of "time CM" and "participation CM (PTCM)" process in step S62, the flow of FIG. 3 is ended to go to step S22 in FIG. 2 for starting or continuing the digital moving image content. The details of "time CM" and "participation CM (PTCM)" process in step S62 will be explained later. On the other hand, if the sufficient number of points is detected in step S60, the flow is instantly ended to go to step S22 in FIG. 2. In other words, the points are automatically used to continue viewing the digital moving image content with CM eliminated under toll-free condition. By the way, if the setting by the user to automatically use the available points is not confirmed in step S58, the flow goes to step S62 regardless of the number of available points.

On the other hand, if it is confirmed in step S56 that the "time CM" is for informing the user name, the flow goes to step S64 in which the sponsor name is indicated in television display 36 and announced from the speaker of the television set, the flow then going to the end of CM process in FIG. 3 to start digital moving image content in S22 in FIG. 2. Thus, it is impossible for the user to eliminate "time CM" for informing of the sponsor name even if the number of available points is sufficient for CM elimination. In other words, elimination of "time CM" for informing of the sponsor name from digital moving image content is only possible by mean of setting "toll television" mode, which is to be detected in step S42.

If it is determined in step S46 that the CM to be interposed at the time detected in step S44 is "station break CM (SBCM)" for insertion between a pair of unspecified digital moving image contents, the flow goes to step S66, in which "station break CM (SBCM)" process is carried out. After the completion of "station break CM (SBCM)" process in step S66, the flow of FIG. 3 is ended to go to step S22 in FIG. 2 for starting or continuing the digital moving image content. The details of "station break CM (SBCM)" process in step S66 will be explained later.

Figure 4:
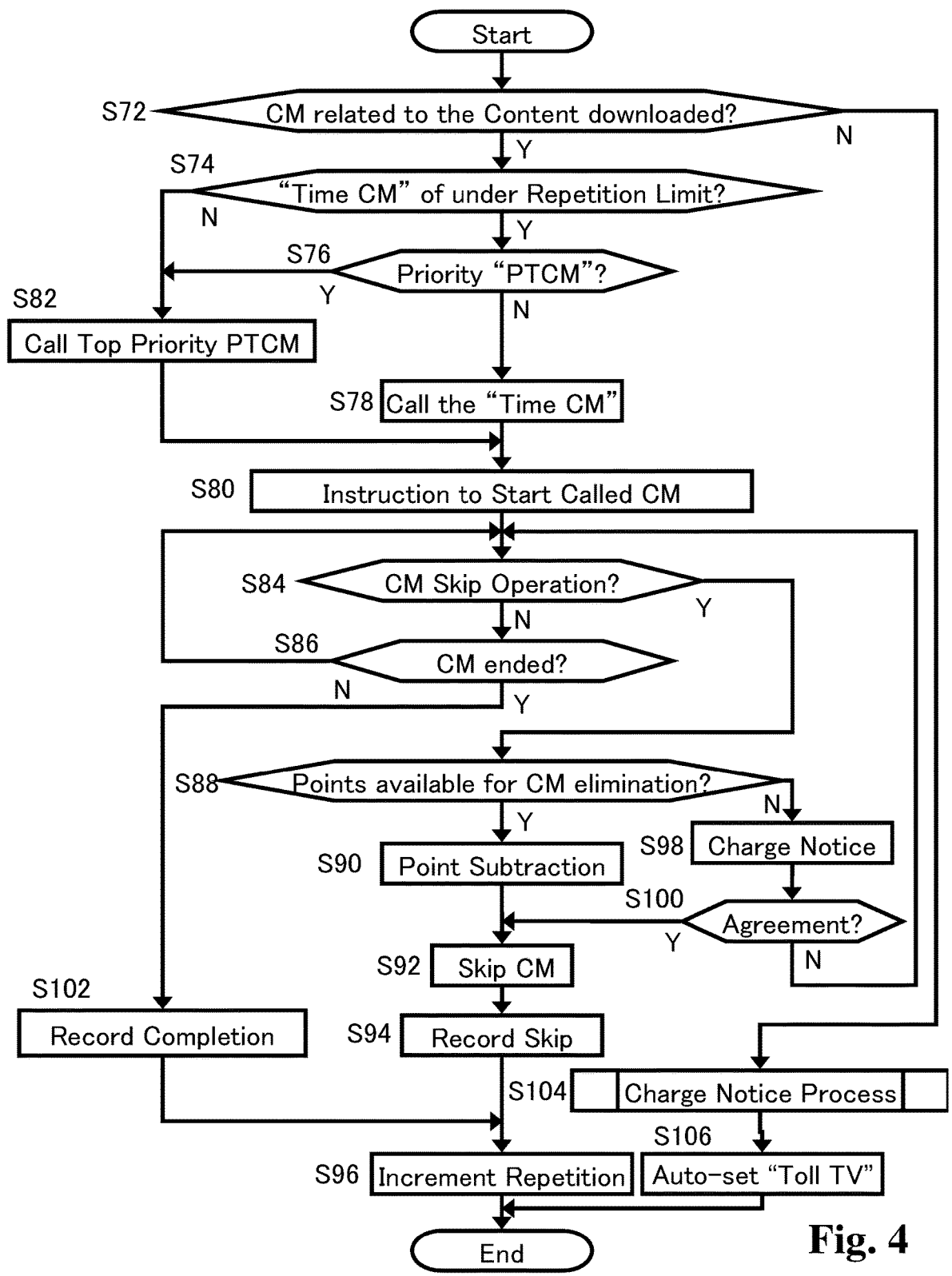
FIG. 4 is a flowchart showing the detailed function of "time CM" and "participation CM (PTCM)" process in step S62 of FIG. 3.

FIG. 4 is a flowchart showing the detailed function of "time CM" and "participation CM (PTCM)" process in step S62 of FIG. 3. If the flowchart starts, it is checked in step S72 whether or not any CM data related to the digital moving image content has been downloaded and stored. The CM related to the digital moving image content includes "time CM" and "participation CM (PTCM)" to be interposed into the digital moving image content under contract with the provider thereof. The data for the above mentioned CM is normally assumed to be downloaded and stored in CM recorder 28 in FIG. 1 in advance to actually viewing the related digital moving image content. Step 72 is for checking whether or not the above assumption has been really accomplished.

If it is confirmed in step S72 that CM data related to the digital moving image content has been downloaded and stored, the flow goes to step S74 to check whether or not the stored CM's include "time CM" which was interposed into the digital moving image content for a number of times under a predetermined repetition limit or has never been interposed. "Time CM" is to be repeatedly interposed into the related digital moving image content, the limit of the repetition times being predetermined in accordance with the CM contract. If the stored CM's include such "time CM" that the number of repetition times is less than the limit, step 74 is to detect such "time CM". If the above mentioned "time CM" of under the repetition limit is detected in step S74, the flow goes to step S76 to check whether or not the stored CM's include any priority "participation CM (PTCM)" which is ready and waiting to be interposed into the related digital moving image content in preference to the above mentioned "time CM" in accordance with the CM contract. If there is no priority "participation CM (PTCM)" detected in step S76, the flow goes to step S78, in which the "time CM" is called and retrieved from CM recorder 28 in FIG. 1. Step S78 is followed by step S80 for instructing television set 2 to start the called CM on television display 36.

If it is not determined in step S74 that the stored CM's include "time CM" which was interposed for a number of times under a predetermined repetition limit or has never been interposed, it means that the stored CM to be interposed into the digital moving image content includes only "participation CM (PTCM)'s". So, in this case, the flow goes to step S82, in which the top priority one of the "participation CM (PTCM)'s" is called and retrieved from CM recorder 28 in FIG. 1. Step S82 also is followed by step S80. Further, if it is determined in step S76 that the stored CM's include any priority "participation CM (PTCM)" which is ready and waiting to be interposed in preference to the "time CM" detected in step S74, the flow goes to step S82, in which the priority "participation CM (PTCM)" detected in step S76 is called as the top priority "participation CM (PTCM)" and retrieved from CM recorder 28 in FIG. 1, step S82 being followed by S80 also in this case for instructing television set 2 to start the called CM on television display 36.

After the instruction is step S80 to start the called CM on television display 36, the flow goes to step S84 to check whether or not a CM skip operation is made by means of remote controller 30 or the like. If not, the flow goes to step S86 to check whether or not the CM has been ended. If not, the flow goes back to step S84 to repeat steps S84 and S86 unless CM skip operation is made or the CM ends. Thus, the CM skip operation is possible and detectable any time as long as the CM continues.

If it is detected in step S84 that a CM skip operation is made, the flow gees to step S88 to check whether or not the number of available points is sufficient for eliminating the CM from the digital moving image content currently viewed. If it is confirmed in step S88 that the number of points is sufficient, the flow goes to step S90 to subtract a predetermined number of points from the available points. Then, the CM skip is carried out in step S92, the fact of the CM skip being recorded in step S94. Further, in step S96, the repetition time of interposing the CM is incremented before going to the end of the flow of FIG. 4. Thus, a CM which is skipped on the way to its end in response to CM skip operation with the point subtraction is included into the number of repetition. The series of above steps are carried out so rapidly in response to the CM skip operation that step S22 in FIG. 2 instantly follows the detection of CM skip operation in step S84 to recommence the digital moving image content.

On the other hand, if it is determined in step S88 that the number of available points is insufficient for eliminating the CM from the digital moving image content currently viewed, the flow goes to step S98 to notice that the CM skip operation will be charged every time, and wait for the agreement operation in a predetermined time in step S100. If the agreement operation is detected in the predetermined time in step S100, the flow goes to step S92 to carry out the CM skip. Also in this case, the repetition time of interposing the CM is incremented in step S96 because payment is done in compensation for the CM skip on the way to its end.

If the agreement operation is not detected in the predetermined time in step S100, the flow returns to step S84 with the CM skip operation at that time made ineffective. Thus, the flow returns to the repetition of steps S84 and S86. In other words, the CM continues with no charge caused if neither agreement operation at step S100 nor any further operation is made.

If it is detected in step S86 that the CM has been ended, the flow goes to step S102 to record the fact that the CM is completed. Further, in step S96, the repetition time of interposing the CM is incremented before going to the end of the flow of FIG. 4. In this case the digital moving image contents recommences after the completion of CM, which is just the same as in conventional digital broadcast television program content with CM on digital airwave from television station provided by a sponsor.

The above explained functions relate to the expected normal case. On the contrary, if it is detected in step S72 that any CM data related to the digital moving image content has not been previously downloaded and stored on unexpected reason, the flow goes to step S104 for charge notice process. In step S104, it is noticed that the digital moving image content cannot but be viewed in the "toll television" mode. Step 104 further include a payback setting process for executing in advance such a contract that the charge for the digital moving image content viewed in the "toll television" mode for the time being will be refunded on the condition that the related CM's shall be downloaded afterward and actually viewed. The flow then goes to step S106 to automatically set "toll television" mode prior to go to the end. Step S104 still further includes a halt process for accepting a halt operation for a predetermined time to stop the advance of the entire flow in case that the user is not satisfied with a coming automatic "toll television" mode setting.

Figure 5:
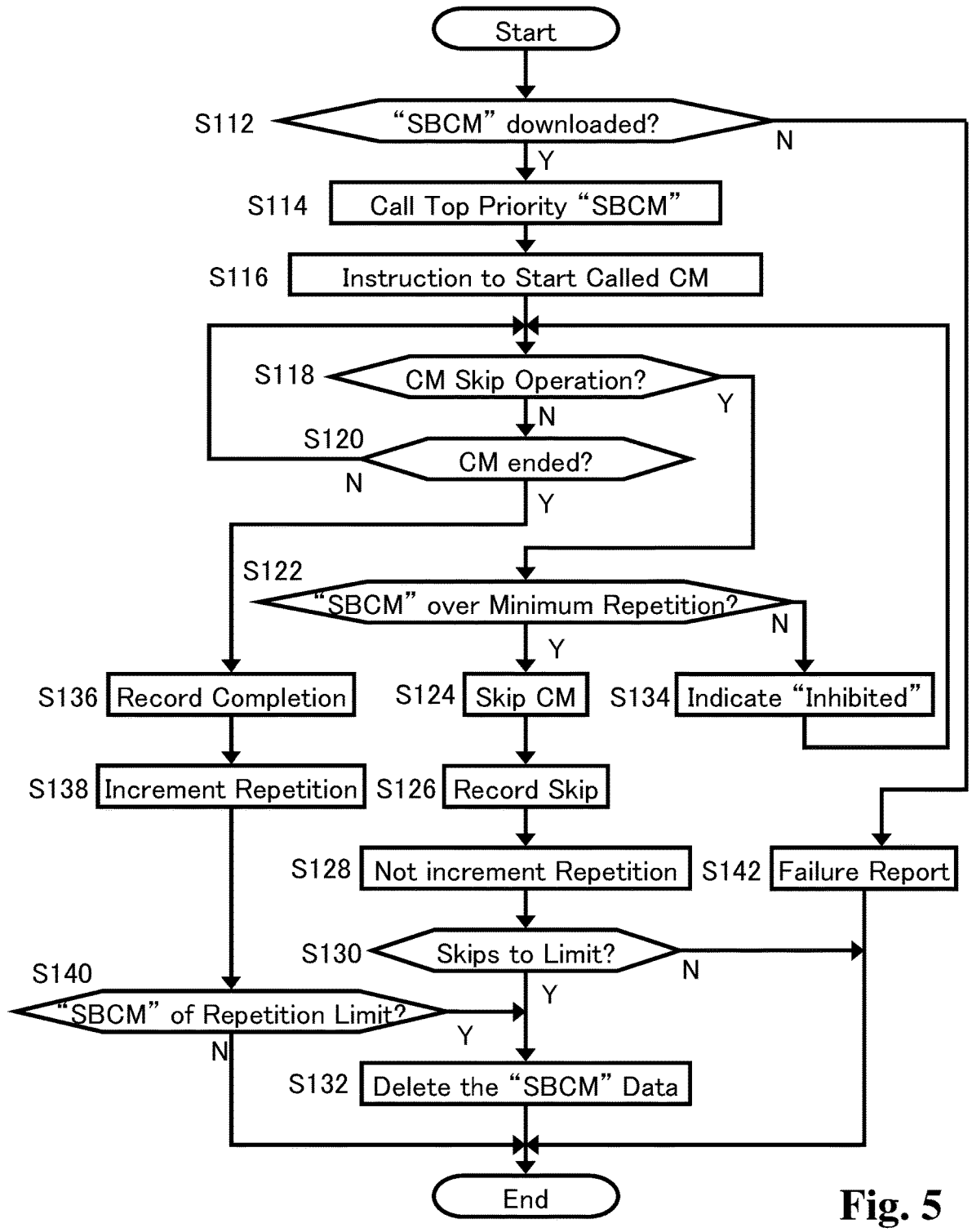
FIG. 5 is a flowchart showing the detailed function of "station break CM (SBCM)" process in step S66 of FIG. 3.

FIG. 5 is a flowchart showing the detailed function of "station break CM (SBCM)" process in step S66 of FIG. 3. If the flowchart starts, it is checked in step S112 whether or not any "station break CM (SBCM)" data has been downloaded and stored. The downloaded "Station break CM (SBCM)" data is normally accumulated in CM recorder 28, and is to be partially replaced in accordance with a predetermined schedule by new "station break CM (SBCM)" data regularly downloaded in predawn every day. Step S112 is to check whether or not the above updating of the storage of "station break CM (SBCM)" in CM recorder 28 is accurately carried out.

If it is confirmed in step S112 that "station break CM (SBCM)" data has been downloaded and stored, the flow goes to step S114, in which the top priority one of the "station break CM (SBCM)" is called and retrieved from CM recorder 28 in FIG. 1. Step S114 is followed by step S116 for instructing television set 2 to start the called CM on television display 36.

After the instruction is step S116 to start the called CM on television display 36, the flow goes to step S118 to check whether or not a CM skip operation is made by means of remote controller 30 or the like. If not, the flow goes to step S120 to check whether or not the CM has been ended. If not, the flow goes back to step S118 to repeat steps S118 and S120 unless CM skip operation is made or the CM ends. Thus, the CM skip operation is possible and detectable any time as long as the CM continues.

If it is detected in step S118 that a CM skip operation is made, the flow gees to step S122 to check whether or not the "station break CM (SBCM)" was interposed between digital moving image contents for a number of times over a predetermined minimum repetition times. If the above mentioned "station break CM (SBCM)" of over minimum repetition is detected in step S122, the flow goes to step S124 to carry out the CM skip, the fact of the CM skip being recorded in step S124. It should be noted in the above case of "station break CM (SBCM)" actuary skipped in midstream that the repetition time is so treated in step S128 as not to increment the repetition times.

Next in step S130, it is checked whether or not the times of actual skips of the same "station break CM (SBCM)" recorded in step S126 in response to the carrying out in step S124 reaches to a predetermined limit. If it is detected in step S130 that the number of carried out skips reaches to the limit, the flow goes to step S132 to delete the "station break CM (SBCM)" from CM recorder 28 in FIG. 1 before going to the end of the flow. This is for releasing the user from a burden of repeating the CM skipping operations for the same uninterested "station break CM (SBCM)" for excessive times. In other words, the repetition of interposing an uninterested same "station break CM (SBCM)" is to automatically cease in response to a limited number of CM skipping operations. On the other hand, if it is not detected in step S130 that the number of carried out skips reaches to the limit, the flow directly goes to the end of the flow. The series of above steps from steps S118 to S132 are carried out so rapidly in response to the CM skip operation that step S22 in FIG. 2 instantly follows the detection of CM skip operation in step S84 to recommence the digital moving image content.

On the other hand, if the above mentioned "station break CM (SBCM)" of over minimum repetition is not detected in step S122, the flow goes to step S134 to make such an indication at television display 36 and the speaker of the television set that the CM skip is inhibited. In place of the indicating the inhibition, it may be possible to superimpose "New CM" or the like on CM image on television display 36, which is the reason of the inhibition. The above mentioned inhibition assures the advertiser of at least minimum repetition times of interposing its "station break CM (SBCM)" per one user. The flow then goes back to step S118 to continue carrying out the CM with steps S118 and S120 being repeated. Thus, in the case of the indication for CM skip inhibition made in step S134, the CM continues to its end without any further operation.

If it is detected in step S120 that the CM has been ended, the flow goes to step S136 to record the fact that the CM is completed. Further, in step S138, the repetition time of interposing the CM is incremented. And, in step S140, it is checked whether or not the repetition time of interposing the "station break CM (SBCM)" has reached to a predetermined repetition limit as a result of the increment at step S138. If it is detected in step S140 that the repetition limit is reached, the flow goes to step S132 to delete the "station break CM (SBCM)" from CM recorder 28 in FIG. 1 before going to the end of the flow. This is for releasing the user from a burden of viewing the same "station break CM (SBCM)" for excessive times. In other words, the repetition of interposing the same "station break CM (SBCM)" is to automatically cease in response to a limited number of CM interposition. On the other hand, if it is not detected in step S140 that the repetition limit is reached, the flow directly goes to the end of the flow. In any case, the digital moving image content starts after the completion of CM according to the flow by way of step S136, which is just the same as in conventional digital broadcast television program content with CM on digital airwave from television station.

The above explained functions relate to the expected normal case relating to "station break CM (SBCM)" viewed or skipped. On the contrary, if it is detected in step S112 that any "station break CM (SBCM)" data has not been previously downloaded and stored on unexpected reason, the flow goes to step S142 for issuing a failure report before going to the end of flow. Thus, step S22 in FIG. 2 can follow step S142 to start the next digital moving image content for the time being.

Figure 6:
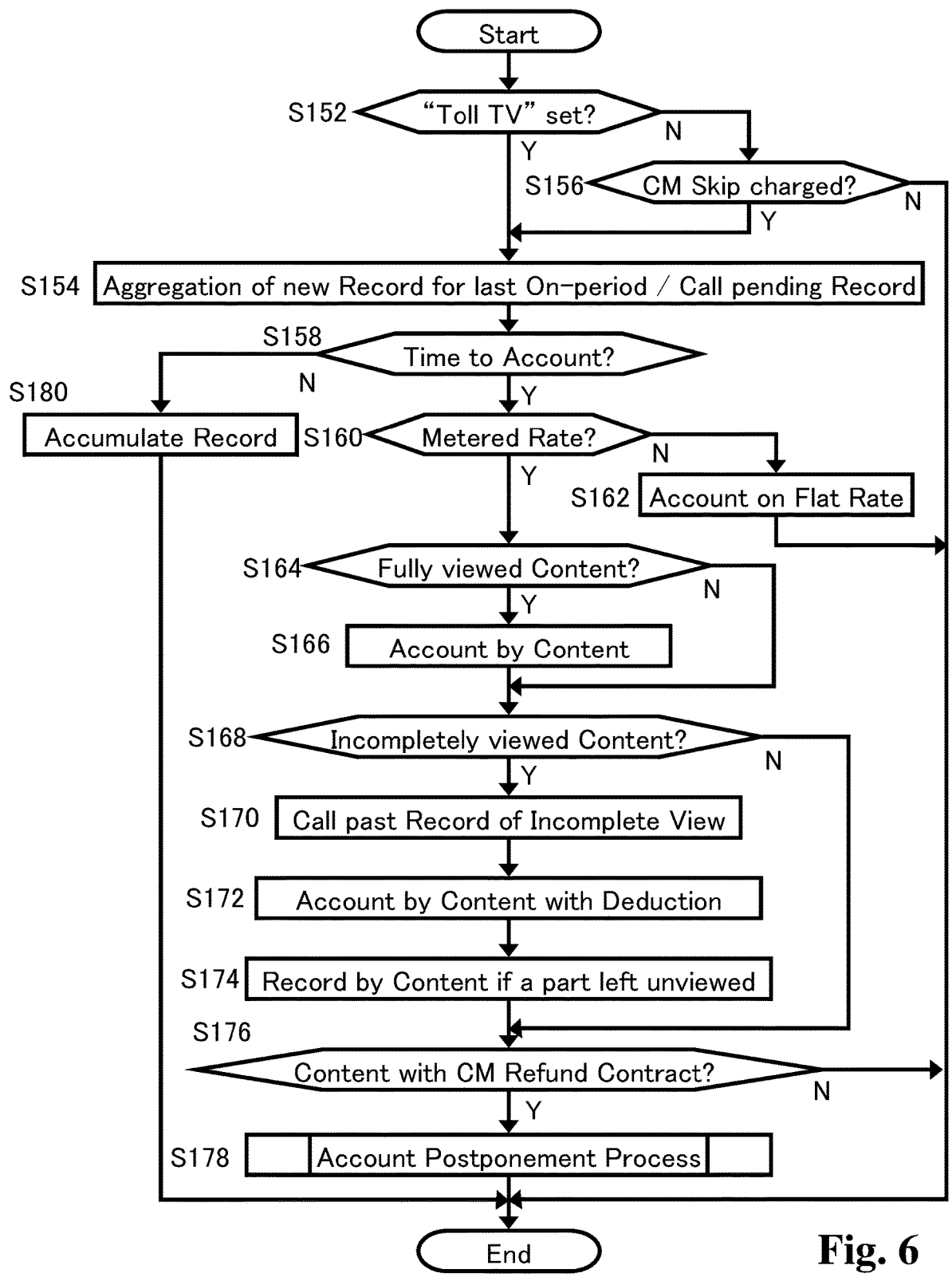
FIG. 6 is a flowchart showing the detailed function of accounting process in step S30 of FIG. 2.

FIG. 6 is a flowchart showing the detailed function of accounting process in step S30 of FIG. 2. If the flowchart starts, it is checked in step S152 whether or not "toll television" mode is set. If "toll television" mode is set, the flow goes to step S154, in which the total record for "toll television" contents viewed during the time period from last turn-on till last turn-off of television set is aggregated. Further in step S154, the past record of pending account is called to be added to the new aggregation. On the other hand, if it is not determined in step S152 that "toll television" mode is set, the flow goes to step S156 to check whether or not CM skip is charged during the time period from last turn-on till last turn-off of television set. If CM skip is charged, the flow goes to step S154 to add the CM skip charge to the new aggregation. On the contrary, if it is not determined in step S156 that CM skip is charged, the flow instantly go to the end.

If the aggregation of new record of "toll television" and the addition of the called pending record has been done in step S154, the flow goes to step S158 to check whether or not time to account comes. For example, the time to account corresponds to 24:00 of the last day of a month. If the time to account is detected in step S158, the flow goes to step S160 to check whether or not the account is based on metered rate. If not, the flow goes to step S162 to account the toll on flat rate before going to the end of the flow.

On the other hand, if it is determined in step S160 that the account is based on metered rate, the flow goes to step S164 to check whether or not fully viewed content is included. If any, the flow goes to step S166 to calculate the account by content to advance to step S168. On the other hand, if it is not determined in step S164 that any fully viewed content is included, the flow directly goes to step S168.

In step S168, it is checked whether or not any incompletely viewed content is included. The incompletely viewed content corresponds to a content which is started to be viewed from the beginning and intermitted in the midstream, or to a content which is recommenced to be viewed from the midstream to the end of the content, or to a content which is only partially viewed at the intermediate part thereof. If it is determined in step S168 that any of such incompletely viewed content is included, the flow goes to step S170 to call a past record of incompletely view of the same content if any. It should be noted that any record of incomplete view does not exist for a new content which has been just incompletely viewed for the first time.

Next in step S172, account by content is calculated on the incompletely viewed content with deduction made for a part already paid in accordance with the past record called in step S170. In other word, in step S172, account is calculated only for a part which is newly viewed this time. Further, in step S174, a part of a content left unviewed this time is recorded if any, the flow then going to step S176. The record made in step S174 is to be called in step 170 next time for account. On the other hand, if it is not determined in step S168 that any of incompletely viewed content is included, the flow directly goes to step S176.

In step S168, it is checked whether or not the contents under account include any contract that the charge on the "toll television" mode will be refunded on the condition that the related CM's shall be downloaded afterward and actually viewed as is explained in relation to step S104 in FIG. 4. If such content is detected in step S176, the flow goes account postponement process in step S178 to exclude the content from account for the time being, the flow then going to the end. On the other hand, if no content relating to the CM refund contract is detected in step S176, the flow directly goes the end. By the way, if the time to account is not detected in step S158 this time, the flow goes to step S180 to add the result aggregated this time in step S154 to the former accumulation of record to go to the end of the flow. The new record thus accumulated in step S180 is to be cleared off upon next time to account.

Figure 7:
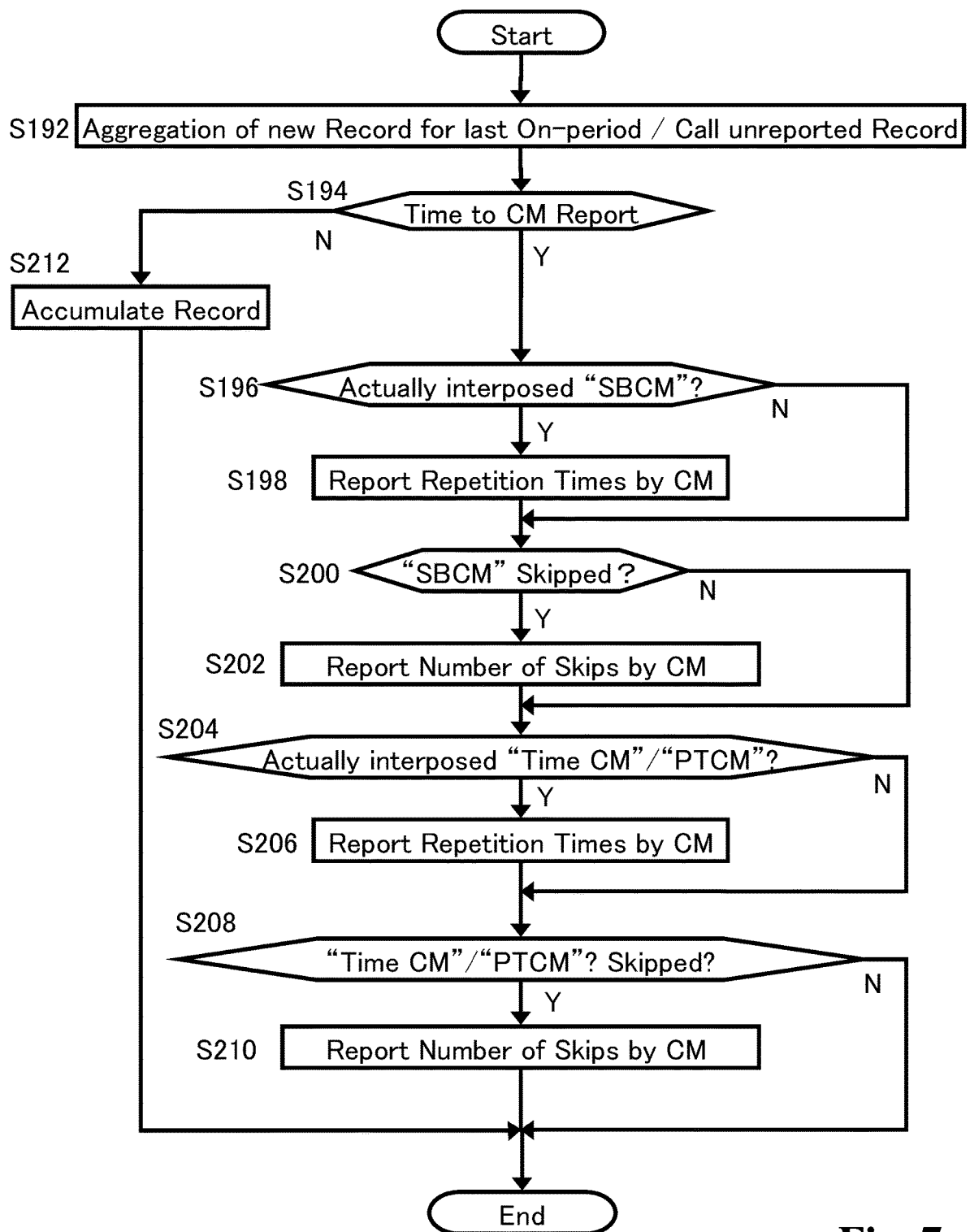
FIG. 7 is a flowchart showing the detailed function of CM perception survey process in step S32 of FIG. 2.

FIG. 7 is a flowchart showing the detailed function of CM perception survey process in step S32 of FIG. 2. If the flowchart starts, in step S192, the total record for CM perception survey during the time period from last turn-on till last turn-off of television set is aggregated. Further in step S192, the unreported past record of CM perception survey is called to be added to the new aggregation. Nest in step S194, it is checked whether or not time to CM report comes. For example, the time to CM report corresponds to 24:00 of every day. In comparison to the time to account in step S158, the time to CM report in step S194 is so designed to very frequently come in according with the digital moving image contents viewing system since the CM perception survey changing from day to day is a very important information for timely managing the CM interposition.

If the time to CM report is detected in step S194, the flow goes to step S196 to check whether or not any "station break CM (SBCM)" is actually interposed. If any, the flow goes to step S198 to report the repetition times by CM for "station break CM (SBCM)" actually interposed, the flow then going to step S200. As has been explained in relation to step S128 of FIG. 5, "station break CM (SBCM)" which is skipped in midstream of interposition is not counted into the repetition time. On the other hand, if "station break CM (SBCM)" actually interposed is not detected in step S196, the flow directly goes to step S200.

In step S200, it is checked whether or not any "station break CM (SBCM)" actually interposed is skipped in the midstream. If any, the flow goes to step S202 to report the number of skips by CM for "station break CM (SBCM)" actually interposed, the flow then going to step S204. On the other hand, if "station break CM (SBCM)" skipped is not detected in step S200, the flow directly goes to step S204.

In step S204, it is checked whether or not any "time CM" or "participation CM (PTCM)" is actually interposed. If any, the flow goes to step S206 to report the repetition times by CM for "time CM" or "participation CM (PTCM)" actually interposed, the flow then going to step S208. As has been explained in relation to step S96 of FIG. 4, "time CM" or "participation CM (PTCM)" which is skipped in midstream of interposition with point subtraction or payment agreed is included into the repetition time since such a case is considered as an interposition. On the other hand, if none of "time CM" and "participation CM (PTCM)" actually interposed is detected in step S204, the flow directly goes to step S208.

In step S208, it is checked whether or not any of "time CM" and "participation CM (PTCM)" actually interposed is skipped in the midstream. If any, the flow goes to step S210 to report the number of skips by CM for "time CM" or "participation CM (PTCM)" actually interposed, the flow then going to the end. On the other hand, if none of "time CM" and "participation CM (PTCM)" skipped is detected in step S208, the flow directly goes to the end. By the way, if the time to CM report is not detected in step S194 this time, the flow goes to step S212 to add the result aggregated this time in step S192 to the former accumulation of record to go to the end of the flow. The new record thus accumulated in step S212 is to be reported upon next time to CM report.

What is claimed is:

1. A receiving apparatus capable of receiving digital contents and commercial messages from outside source comprising:

a recorder arranged to record commercial messages received from the outside source, wherein each of the commercial messages is received with information of timing for displaying it, the information including a first type of information indicating a timing between a pair of different digital contents both unrelated to specific one of the commercial messages and a second type of information indicating a timing within a same specific digital content related to specific one of the commercial messages;

a display arranged to display digital content received from outside source and commercial message retrieved from the recorder;

a time checker arranged to determine whether or not time to interpose one of the commercial messages comes; and a timing controller arranged to control a timing of displaying one of the commercial messages at the display in accordance with the information included in the commercial message in relation to the display of the digital content, wherein the timing controller is arranged to check whether the time determined by the time checker is for a commercial message with the first type of information to be interposed between the pair of different digital contents after the end of a preceding one of the pair of digital contents and the beginning of a succeeding one of the pair of digital contents, or for a commercial message with the second type of information to be interposed into the same specific digital content related to the specific one of the commercial messages, wherein the timing controller is arranged to interpose the commercial message with the first type of information between the pair of different digital contents both unrelated to the interposed commercial message, and to interpose the commercial message with the second type of information within the same specific digital content related to the interposed commercial message.

2. The receiving apparatus according to claim 1, wherein the recorder is arranged to record the digital content received from the outside source.

3. The receiving apparatus according to claim 1, wherein the timing controller is arranged to control the display of the commercial message at the display in accordance with internal information originated within the receiving apparatus.

4. The receiving apparatus according to claim 3, wherein the internal information includes history of actually displaying the commercial message.

5. The receiving apparatus according to claim 3, wherein the internal information includes history of the commercial message skipped at the receiving apparatus.

6. The receiving apparatus according to claim 1, wherein the timing controller is arranged to control the repetition time of displaying the same commercial message.

7. The receiving apparatus according to claim 1, wherein the timing controller is arranged to control whether or not to actually display a specific commercial message.

8. The receiving apparatus according to claim 1, wherein the timing controller is arranged to control the order of displaying a plurality of commercial messages.

9. A receiving apparatus capable of receiving digital contents and commercial messages from outside source comprising:

a display arranged to display the digital contents and the commercial messages, each of the commercial messages being received with information of timing for displaying it, the information including a first type of information indicating a timing between a pair of different digital contents both unrelated to specific one of the commercial messages and a second type of information indicating a timing within a same specific digital content related to specific one of the commercial messages;

an operating portion arranged to transmit a will of a user to skip the display of the commercial message;

a display controller arranged to control the display of the commercial message at the display in combination with the operating portion and the information;

a time checker arranged to determine whether or not time to interpose one of the commercial messages comes; and a timing controller arranged to control a timing of displaying one of the commercial messages at the display in accordance with the information included in the commercial message in relation to the display of the digital content, wherein the timing controller is arranged to check whether the time determined by the time checker is for a commercial message with the first type of information to be interposed between the pair of different digital contents after the end of a preceding one of the pair of digital contents and the beginning of a succeeding one of the pair of digital contents, or for a commercial message with the second type of information to be interposed into the same specific digital content related to the specific one of the commercial messages, wherein the timing controller is arranged to interpose the commercial message with the first type of information between the pair of different digital contents both unrelated to the interposed commercial message, and to interpose the commercial message with the second type of information within the same specific digital content related to the interposed commercial message.

10. The receiving apparatus according to claim 9, wherein the display controller is arranged to prevent receiving apparatus from carrying out to skip the display of the commercial message in response to the operating portion under a predetermined condition.

11. The receiving apparatus according to claim 10, wherein the predetermined condition is that the repetition time of displaying the same commercial message is less than a minimum requirement.

12. The receiving apparatus according to claim 10, wherein the predetermined condition is that the user disagrees with a necessary compensation for the skip of the commercial message interposed within the digital content.

13. The receiving apparatus according to claim 9, wherein the display controller is arranged to display the same commercial message no more with the will of the user repeatedly transmitted through the operating portion over a predetermined times.

14. A receiving apparatus capable of receiving digital contents and commercial messages from outside source comprising:

a display arranged to display the digital contents and the commercial message, wherein each of the commercial message is received with information of timing for displaying it, the information including a first type of information indicating a timing between a pair of different digital contents both unrelated to specific one of the commercial messages and a second type of information indicating a timing within a same specific digital content related to specific one of the commercial messages;

a time checker arranged to determine whether or not time to interpose one of the commercial messages comes; and a timing controller arranged to control a timing of displaying one of the commercial messages at the display in accordance with the information included in the commercial message in relation to the display of the digital content, wherein the timing controller is arranged to check whether the time determined by the time checker is for the pair of different commercial message with the first type of information to be interposed between a pair of digital contents after the end of a preceding one of the pair of digital contents and the beginning of a succeeding one of the pair of digital contents, or for a commercial message with the second type of information to be interposed into the same specific digital content related to the specific one of the commercial messages, wherein the timing controller is arranged to interpose the commercial message with the first type of information between the pair of different digital contents both unrelated to the interposed commercial message, and to interpose the commercial message with the second type of information within the same specific digital content related to the interposed commercial message, wherein the timing controller is arranged to control the display of the commercial message alternatively in a first mode to display the digital content with the commercial message interposed and in a second mode to display the digital content with the commercial message not interposed.

15. The receiving apparatus according to claim 14, wherein the timing controller is arranged to make notice that the controller displays the digital content in the first mode.

16. The receiving apparatus according to claim 14, wherein the timing controller is arranged to make notice that compensation is need for an elimination of the commercial message.

* * * * *